United States Patent
Suzuki et al.

(10) Patent No.: US 9,202,626 B2
(45) Date of Patent: Dec. 1, 2015

(54) MULTILAYER CERAMIC CAPACITOR, DIELECTRIC CERAMIC, MULTILAYER CERAMIC ELECTRONIC COMPONENT, AND METHOD FOR MANUFACTURING MULTILAYER CERAMIC CAPACITOR

(71) Applicant: MURATA MANUFACTURING CO., LTD., Nagaokakyo (JP)

(72) Inventors: Shoichiro Suzuki, Nagaokakyo (JP); Koichi Banno, Nagaokakyo (JP); Taisuke Kanzaki, Nagaokakyo (JP); Akihiro Shiota, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 159 days.

(21) Appl. No.: 14/031,198

(22) Filed: Sep. 19, 2013

(65) Prior Publication Data

US 2014/0016243 A1 Jan. 16, 2014

Related U.S. Application Data

(63) Continuation of application No. PCT/JP2012/057266, filed on Mar. 22, 2012.

(30) Foreign Application Priority Data

Mar. 25, 2011 (JP) .................................. 2011-068194

(51) Int. Cl.
*H01G 4/12* (2006.01)
*H01G 4/232* (2006.01)
(Continued)

(52) U.S. Cl.
CPC ............ *H01G 4/1209* (2013.01); *C04B 35/453* (2013.01); *C04B 35/475* (2013.01);
(Continued)

(58) Field of Classification Search
None
See application file for complete search history.

(56) References Cited

U.S. PATENT DOCUMENTS

2004/0131831 A1* 7/2004 Yoshikawa et al. ............ 428/209
2010/0165541 A1* 7/2010 Sasabayashi et al. ......... 361/303
(Continued)

FOREIGN PATENT DOCUMENTS

JP 2000313662 A 11/2000
JP 200233845 11/2002
(Continued)

OTHER PUBLICATIONS

PCT/JP2012/057266, International Search Report, date of mailing of Search report Jun. 19, 2012.
(Continued)

*Primary Examiner* — Dion R Ferguson
(74) *Attorney, Agent, or Firm* — Arent Fox LLP

(57) ABSTRACT

Provided in a dielectric ceramic having flat capacitance characteristics and a high dielectric constant, and a multilayer ceramic electronic component (such as a multilayer ceramic capacitor) in which the dielectric ceramic is used. A multilayer ceramic capacitor includes a multilayer body having a plurality of dielectric ceramic layers and a plurality of internal electrodes, and external electrodes formed on the multilayer body. The composition of the multilayer body includes any of a bismuth layered compound containing Sr, Bi and Ti, a bismuth layered compound containing Sr, Bi and Nb, and a bismuth layered compound containing Ca, Bi and Ti as a primary ingredient, Bi and at least one of Cu, Ba, Zn and Li, and satisfies the conditions that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

20 Claims, 1 Drawing Sheet

(51) Int. Cl.
- *H01G 4/30* (2006.01)
- *C04B 35/475* (2006.01)
- *C04B 35/495* (2006.01)
- *C04B 35/626* (2006.01)
- *C04B 35/453* (2006.01)
- *C04B 35/64* (2006.01)

(52) U.S. Cl.
CPC ......... *C04B35/495* (2013.01); *C04B 35/62685* (2013.01); *C04B 35/64* (2013.01); *H01G 4/1227* (2013.01); *H01G 4/232* (2013.01); *H01G 4/30* (2013.01); *C04B 2235/3203* (2013.01); *C04B 2235/3208* (2013.01); *C04B 2235/3213* (2013.01); *C04B 2235/3215* (2013.01); *C04B 2235/3251* (2013.01); *C04B 2235/3255* (2013.01); *C04B 2235/3281* (2013.01); *C04B 2235/3284* (2013.01); *C04B 2235/3298* (2013.01); *C04B 2235/6025* (2013.01); *C04B 2235/6562* (2013.01); *C04B 2235/6567* (2013.01)

(56) References Cited

U.S. PATENT DOCUMENTS

| | | | |
|---|---|---|---|
| 2012/0081836 A1* | 4/2012 | Yamaguchi | 361/321.4 |
| 2012/0147524 A1* | 6/2012 | Okamoto et al. | 361/321.4 |
| 2012/0250216 A1* | 10/2012 | Ishii et al. | 361/301.4 |

FOREIGN PATENT DOCUMENTS

| | | |
|---|---|---|
| JP | 2005187228 | 7/2005 |
| JP | 2007-290940 A | 11/2007 |
| WO | WO-2004065668 A1 | 8/2004 |

OTHER PUBLICATIONS

PCT/JP2012/057266, Written Opinion of the International Searching Authority, date of mailing Jun. 19, 2012.

* cited by examiner

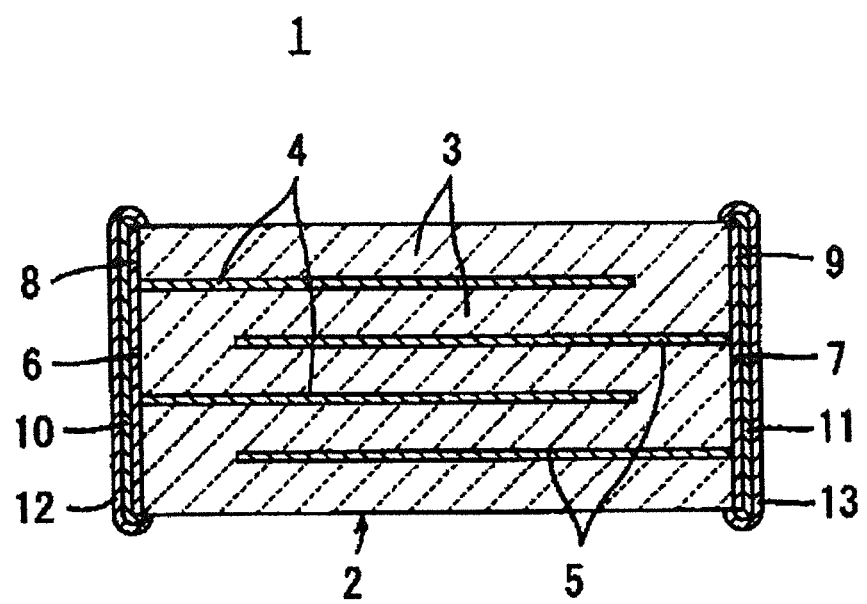

MULTILAYER CERAMIC CAPACITOR, DIELECTRIC CERAMIC, MULTILAYER CERAMIC ELECTRONIC COMPONENT, AND METHOD FOR MANUFACTURING MULTILAYER CERAMIC CAPACITOR

This is a continuation of application Serial No. PCT/JP2012/057266, filed Mar. 22, 2012, the entire contents of which are incorporated herein by reference.

TECHNICAL FIELD

The present invention relates to a multilayer ceramic capacitor, a dielectric ceramic used in the multilayer ceramic capacitor, a multilayer ceramic electronic component represented by the multilayer ceramic capacitor, and a method for manufacturing the multilayer ceramic capacitor.

BACKGROUND ART

With reference to FIG. 1, a multilayer ceramic capacitor 1, a representative example of a multilayer ceramic electronic component according to the present invention, will be described first.

Multilayer ceramic capacitor 1 includes a multilayer body 2 which is formed from a plurality of laminated ceramic layers 3 and a plurality of internal electrodes 4 and 5 each formed along an interface between ceramic layers 3.

A first external electrode 8 and a second external electrode 9 are formed at mutually different positions on an outer surface of multilayer body 2. In the multilayer ceramic capacitor 1 illustrated in FIG. 1, first external electrode 8 and second external electrode 9 are formed respectively on opposing end surfaces 6 and 7 of multilayer body 2. Internal electrode 4 includes a plurality of first internal electrodes 4 which are electrically connected to first external electrode 8 and internal electrode 5 includes a plurality of second internal electrodes 5 which are electrically connected to second external electrode 9. First internal electrodes 4 and second internal electrodes 5 are disposed alternately in the lamination direction. If necessary, a surface of external electrode 8 is coated with a first plating layer 10 and a second plating layer 12, and a surface of external electrode 9 is coated with a first plating layer 11 and a second plating layer 13.

In recent years, a capacitor that has flat capacitance characteristics from a low temperature to a high temperature exceeding 150° C. has been required, especially in the field of automobiles.

Conventionally, a calcium titanate ceramic is known as such dielectric ceramic having the flat capacitance characteristics. For example, PTD 1 discloses a dielectric ceramic containing calcium titanate at 0 to 45%, $Al_2O_3$ and $SiO_2$ at a total amount of 2 to 20%, at least one of MnO, $Cr_2O_3$, $Fe_2O_3$, CoO and NiO at a total amount of 0.1 to 1.0%, and the remainder being magnesium titanate at 50% or more.

CITATION LIST

Patent Document

PTD 1: Japanese Patent Laying-Open No. 2002-338345

SUMMARY OF INVENTION

Technical Problem

The dielectric ceramic disclosed in PTD 1 has the problem of a low dielectric constant, notwithstanding the flat capacitance characteristics,.

The present invention has been accomplished in view of the aforementioned problem, and it is therefore an object of the present invention to provide a dielectric ceramic having flat capacitance characteristics and a high dielectric constant, and a multilayer ceramic electronic component using the dielectric ceramic.

Solution to Problem

A multilayer ceramic capacitor of the present invention includes a multilayer body having a plurality of laminated dielectric ceramic layers and a plurality of internal electrodes each formed along an interface between the dielectric ceramic layers, and a plurality of external electrodes formed on an outer surface of the multilayer body and electrically connected with the internal electrodes. The composition of the multilayer body includes any bismuth layered compound containing Sr, Bi and Ti, a bismuth layered compound containing Sr, Bi and Nb, and a bismuth layered compound containing Ca, Bi and Ti as a primary ingredient, Bi and at least one of Cu, Ba, Zn and Li, and satisfies such the condition that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

A multilayer ceramic capacitor of the present invention includes a multilayer body having a plurality of laminated dielectric ceramic layers and a plurality of internal electrodes formed along an interface between the dielectric ceramic layers, and a plurality of external electrodes formed on an outer surface of the multilayer body and electrically connected with said internal electrodes. The composition of the multilayer body includes any bismuth layered compound containing Sr, Bi and Ti, a bismuth layered compound containing Sr, Bi and Nb, and a bismuth layered compound containing Ca, Bi and Ti as a primary ingredient, Bi and at least one of Cu, Ba, Zn and Li, and satisfies such the condition that if the Ti content is 400 molar parts or the Nb content is 200 molar parts when the multilayer body is dissolved in a solvent, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

It is preferable that in the multilayer ceramic capacitor of the present invention, the primary ingredient of the internal electrode is Al.

A dielectric ceramic of the present invention includes any bismuth layered compound containing Sr, Bi and Ti, a bismuth layered compound containing Sr, Bi and Nb, and a bismuth layered compound containing Ca, Bi and Ti as a primary ingredient, Bi and at least one of Cu, Ba, Zn and Li; and satisfies such a condition that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

The dielectric ceramic of the present invention can be used in a multilayer ceramic electronic component.

It is preferable that in the dielectric ceramic electronic component of the present invention, the primary ingredient of the internal electrode is Al.

A method for manufacturing the multi layer ceramic capacitor of the present invention includes the steps of: preparing primary ingredient powder including any bismuth layered compound containing Sr, Bi and Ti, a bismuth layered compound containing Sr, Bi and Nb, and a bismuth layered compound containing Ca, Bi and Ti as a primary ingredient; preparing at least one of Cu compound, Ba compound, Zn compound and Li compound; preparing Bi compound; blending the primary ingredient power, at least one of the Cu compound, the Ba compound, the Zn compound and the Li compound, and the Bi compound to offer a ceramic slurry; obtaining a ceramic green sheet from the ceramic slurry; laminating the ceramic green sheet and an internal electrode layer to offer a non-sintered multilayer body; and sintering the non-sintered multilayer body to offer a multilayer body with an internal electrode formed between dielectric layers. The multilayer body satisfies the condition that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

Advantageous Effects of Invention

According to the present invention, it is possible to provide a dielectric ceramic having flat capacitance characteristics and a high dielectric constant, contributing greatly to making a multilayer ceramic electronic component smaller in size and higher in performance.

BRIEF DESCRIPTION OF DRAWINGS

FIG. 1 is a schematic view illustrating an example of a multilayer ceramic capacitor representing a multilayer ceramic electronic component of the present invention.

DESCRIPTION OF EMBODIMENTS

A dielectric ceramic of the present invention includes any one of a bismuth layered compound containing Sr, Bi and Ti, a bismuth layered compound containing Sr, Bi and Nb, and a bismuth layered compound containing Ca, Bi and Ti as the primary ingredient, Bi and at least one of Cu, Ba, Zn and Li. If the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts. Thereby, it is possible to sinter the dielectric ceramic having the above main components at a low temperature to offer a dielectric ceramic having a high dielectric constant and flat capacitance characteristics.

As long as it does not affect the object of the present invention, it is acceptable for the dielectric ceramic of the present invention to contain a rare earth element, Mg, Mn, V, Al, Ni, Co or the like.

An example of a method for manufacturing the dielectric ceramic of the present invention will now be described.

First, powders of Sr, Bi, Ti, Ca and Nb oxides or carbonates are prepared as a starting material for the primary ingredient. The starting material powders are weighed, blended and pulverized in a solution with the help of a mechanical medium. After drying, a heat treatment is performed on the obtained powder mixture to provide the power of a bismuth layered compound serving as the primary ingredient. This method is generally referred to as a solid-phase synthesis method; alternatively, it is acceptable to use a wet synthesis method such as a hydrothermal synthesis method, a hydrolysis method, or an oxalic acid method.

As a bismuth layered compound serving as the primary ingredient, $SrBi_4Ti_4O_{15}$, $SrBi_2Nb_2O_9$, $CaBi_4Ti_4O_{15}$ or the like may be given as examples; however, a non-stoichiometric compound is also applicable.

Next, powders of Bi, Cu, Ba, Zn and Li oxides or carbonates are added into the primary ingredient powder at a predetermined amount. As long as it does not affect the object of the present invention, the powders are not be limited to oxide powders or carbonate powders. The powders are blended in a solution, and after drying, the ceramic raw material powder is obtained as the final raw material.

The subsequent procedures will be described by taking a multilayer ceramic capacitor representing a multilayer ceramic electronic component of the present invention as an example.

The abovementioned ceramic raw material powder is prepared. The ceramic raw material powder is blended, where necessary, with an organic binder component in a solvent to provide a ceramic slurry. Thereafter, a ceramic green sheet is obtained by forming the ceramic slurry into a sheet.

Next, a conductor film serving as an internal electrode is formed on the ceramic green sheet. It can be formed according to several methods, and among them, a simple one is screen printing method which screen-prints a paste containing metal particles and an organic carrier into a desired pattern. Alternatively, it is acceptable to form the conductor film according to a metal foil transfer-printing method, or to form the conductor film while masking it according to a vacuum thin-film deposition method.

In this way, the ceramic green sheet and the internal electrode layer are laminated in multiple layers, and after being pressed, a raw multilayer body prior to sintering is obtained.

The raw multilayer body is sintered in a sintering furnace under a predetermined atmosphere and temperature to offer a ceramic multilayer body containing a sintered ceramic body. Since the above ceramic raw material powder may be sintered at a low temperature, in the case where the primary ingredient of the conductor film is Al, it is possible that the Al may be sintered together with the ceramic. Even though Al is sintered together with the ceramic, since Bi in the ceramic is non-volatile and may be sintered, for example, under air atmosphere, advantageously it is not possible for the composition of the dielectric ceramic to be changed easily.

The multilayer ceramic capacitor is obtained by forming an external electrode at a location where the internal electrode is drawn out of the ceramic multilayer body. A method such as applying a paste containing glass frit and metal particles such as Cu, Ag and the like on the ceramic multilayer body and baking it thereafter may be given as a method for forming the external electrode. If necessary, a plating layer of Ni, Sn or the like may be formed on an outer surface of the external electrode.

The multilayer ceramic electronic component of the present invention is not limited to being applied to a multilayer ceramic capacitor, it is applicable to various electronic components such as a multilayer ceramic substrate and the like.

EXAMPLE

First, a powder was prepared according to the solid-phase synthesis method, and thereafter calcined to offer the primary ingredient powder of bismuth layered compounds as shown in Table 1.

Next, powders of $Bi_2O_3$, CuO, $BaCO_3$, ZnO and $Li_2CO_3$ were prepared. The powders were weighed in such a way that the additional ingredients of Bi, Cu, Ba, Zn and Li in molar parts relative to 400 molar parts of Ti content or 200 molar parts of Nb content match the molar parts in Table 1, and blended with the primary ingredient. Subsequently, a polyvinyl butyral organic binder was added and blended, thereafter an organic solvent containing toluene was added and the mixture was wet-blended for 24 hours to offer a ceramic slurry. The ceramic slurry was formed into the sheet satisfying a condition that the thickness thereof after sintering was 5 μm form a to the ceramic green sheet.

The obtained ceramic green sheet was confirmed to have the ingredients substantially identical to those shown in Table 1 through ICP emission spectrochemical analysis.

Thereafter, a paste film containing Al powder was formed on the ceramic green sheet through printing. Five layers of the ceramic green sheets were laminated in such a way that the paste films are drawn out alternately. Thereafter, 100 pieces of the ceramic green sheets without having the paste film printed thereon were laminated on both sides of the above 5-layer ceramic green sheet.

The raw multilayer body was heated at 280° C. under an air atmosphere for 6 hours to remove the organic binder, and thereafter sintered in a continuous sintering furnace under an air atmosphere and at a maximum temperature of 850° C. raised at a velocity of 100° C./min to give a sintered body.

The dimensions of the sintered body were 2.0×1.2×1.0 mm, the thickness of the internal electrode was 2 μm, and the opposing area between the internal electrodes was $1.7 \times 10^{-6}$ m$^2$.

The sintered body was dissolved in a solvent, and through ICP emission spectrochemical analysis, the sintered body (except the ingredient Al of the internal electrode) was confirmed to have the ingredients substantially identical to those shown in Table 1.

The sintered body was confirmed to have a bismuth layered structure through an XRD structure analysis performed thereon.

A paste containing Ag and epoxy resin was applied to the end surfaces where the internal electrodes were drawn out of the sintered body, and cured at 180° C.

The dielectric constant at 150° C. was measured for the obtained specimens. First, the capacitance thereof was measured for each of 20 specimens in a range of −55° C. to 180° C. by using an automatic bridge-type detector under the a conditions of 1 kHz and 1.0 Vrms, and thereafter, the dielectric constant at 150° C. was calculated.

A high-temperature load test was performed on 10 specimens under the conditions of 190° C. and 50V. A mean time to failure (MTTF) for each specimen was calculated from the down time thereof.

The results of dielectric constant and mean time to failure for each specimen under the respective conditions are listed in Table 1.

TABLE 1

| Specimen No. | Primary Ingredient | Additional Ingredients (in molar parts) | | | | | Relative to 400 molar parts of Ti content or 200 molar parts of Nb content (in molar parts) | | Dielectric constant | MTTF |
|---|---|---|---|---|---|---|---|---|---|---|
| | | Bi | Cu | Ba | Zn | Li | (Bi content-Ti content) or (Bi content-Nb content) | Total content of Cu, Ba, Zn and Li | | |
| 1* | SrBi$_4$Ti$_4$O$_{15}$ | 0.5 | 1 | | | | 0.5 | 1 | Not Sintered | |
| 2 | SrBi$_4$Ti$_4$O$_{15}$ | 1 | 2 | | | | 1 | 2 | 180 | 123 |
| 3 | SrBi$_4$Ti$_4$O$_{15}$ | 2.5 | 2 | | | | 2.5 | 2 | 166 | 182 |
| 4 | SrBi$_4$Ti$_4$O$_{15}$ | 5 | 2 | | | | 5 | 2 | 132 | 166 |
| 5* | SrBi$_4$Ti$_4$O$_{15}$ | 7.5 | 2 | | | | 7.5 | 2 | 110 | 1 |
| 6* | SrBi$_4$Ti$_4$O$_{15}$ | 2.5 | 0.5 | | | | 2.5 | 0.5 | Not Sintered | |
| 7 | SrBi$_4$Ti$_4$O$_{15}$ | 2.5 | 1 | | | | 2.5 | 1 | 171 | 130 |
| 8 | SrBi$_4$Ti$_4$O$_{15}$ | 2.5 | 5 | | | | 2.5 | 5 | 156 | 192 |
| 9* | SrBi$_4$Ti$_4$O$_{15}$ | 2.5 | 10 | | | | 2.5 | 10 | 122 | 0 |
| 10 | SrBi$_4$Ti$_4$O$_{15}$ | 2.5 | | 5 | | | 2.5 | 5 | 161 | 171 |
| 11 | SrBi$_4$Ti$_4$O$_{15}$ | 2.5 | | | 5 | | 2.5 | 5 | 132 | 181 |
| 12 | SrBi$_4$Ti$_4$O$_{15}$ | 2.5 | | | | 5 | 2.5 | 5 | 148 | 121 |
| 13* | SrBi$_2$Nb$_2$O$_9$ | 0.5 | 1 | | | | 0.5 | 1 | Not Sintered | |
| 14* | SrBi$_2$Nb$_2$O$_9$ | 2.5 | 0.5 | | | | 2.5 | 0.5 | Not Sintered | |
| 15 | SrBi$_2$Nb$_2$O$_9$ | 2.5 | 5 | | | | 2.5 | 5 | 212 | 251 |
| 16 | SrBi$_2$Nb$_2$O$_9$ | 2.5 | | 5 | | | 2.5 | 5 | 201 | 162 |
| 17 | SrBi$_2$Nb$_2$O$_9$ | 2.5 | | | 5 | | 2.5 | 5 | 211 | 181 |
| 18 | SrBi$_2$Nb$_2$O$_9$ | 2.5 | | | | 5 | 2.5 | 5 | 196 | 182 |
| 19* | CaBi$_4$Ti$_4$O$_{15}$ | 0.5 | 1 | | | | 0.5 | 1 | Not Sintered | |
| 20* | CaBi$_4$Ti$_4$O$_{15}$ | 2.5 | 0.5 | | | | 2.5 | 0.5 | Not Sintered | |
| 21 | CaBi$_4$Ti$_4$O$_{15}$ | 2.5 | 5 | | | | 2.5 | 5 | 132 | 105 |
| 22 | CaBi$_4$Ti$_4$O$_{15}$ | 2.5 | | 5 | | | 2.5 | 5 | 122 | 113 |
| 23 | CaBi$_4$Ti$_4$O$_{15}$ | 2.5 | | | 5 | | 2.5 | 5 | 125 | 121 |
| 24 | CaBi$_4$Ti$_4$O$_{15}$ | 2.5 | | | | 5 | 2.5 | 5 | 111 | 101 |

The specimens of No. 1 to 12 had SrBi$_4$Ti$_4$O$_{15}$ as the primary ingredient, and the contents of Bi, Cu, Ba, Zn and Li were changed so as to observe the effects thereof.

The specimens of No. 13 to 18 had SrBi$_2$Nb$_2$O$_9$ as the primary ingredient, and the contents of Bi, Cu, Ba, Zn and Li were changed so as to observe the effects thereof.

The specimens of No. 19 to 24 had CaBi$_4$Ti$_4$O$_{15}$ as the primary ingredient, and the contents of Bi, Cu, Ba, Zn and Li were changed so as to observe the effects thereof.

According to the results in Table 1, the dielectric ceramic, which contains any one of a bismuth layered compound containing Sr, Bi and Ti, a bismuth layered compound containing Sr, Bi and Nb, and a bismuth layered compound containing Ca, Bi and Ti as the primary ingredient, Bi and at least one of Cu, Ba, Zn and Li, and satisfies the a conditions that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts, has a high dielectric constant at 150° C. and a MTTF of 100 hours or more.

INDUSTRIAL APPLICABILITY

The dielectric ceramic of the present invention is applicable to a multilayer ceramic electronic component, especially a multilayer ceramic capacitor, a multilayer ceramic substrate and the like, contributing to making these electronic components smaller in size and higher in performance.

REFERENCE SIGNS LIST

1: multilayer ceramic capacitor; 2: multilayer body; 3: ceramic layer; 4, 5: internal electrode; 6, 7: end surface; 8, 9: external electrode; 10, 11: first plating layer; 12, 13: second plating layer

The invention claimed is:

1. A multilayer ceramic component comprising:
    a multilayer body having a plurality of laminated dielectric ceramic layers and a plurality of internal electrodes each disposed at an interface between said dielectric ceramic layers; and
    an external electrode disposed on an outer surface of said multilayer body and electrically connected to an internal electrode,
    wherein the composition of said dielectric ceramic layer comprises one of a bismuth layered compound containing Sr, Bi, and Ti, a bismuth layered compound containing Sr, Bi, and Nb, and a bismuth layered compound containing Ca, Bi and Ti as a primary ingredient, and auxiliary ingredients of Bi and at least one member of the group consisting of Cu, Ba, Zn and Li, and
    wherein if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

2. The multilayer ceramic component according to claim 1, wherein said contents of Ti or Nb, and total contents Cu, Ba, Zn and Li are when said dielectric ceramic layer is dissolved in a solvent.

3. The multilayer ceramic component according to claim 2, wherein said internal electrode comprises Al.

4. The multilayer ceramic component according to claim 1, wherein said internal electrode comprises Al.

5. The multilayer ceramic component according to claim 4, wherein said bismuth layered compound contains Sr, Bi and Ti as a primary ingredient.

6. The multilayer ceramic component according to claim 5, wherein said dielectric ceramic contains Cu.

7. The multilayer ceramic component according to claim 4, wherein said bismuth layered compound contains Sr, Bi and Nb as a primary ingredient.

8. The multilayer ceramic component according to claim 7, wherein said dielectric ceramic contains Cu.

9. The multilayer ceramic component according to claim 4, wherein said bismuth layered compound contains Ca, Bi and Nb as a primary ingredient.

10. The multilayer ceramic component according to claim 9, wherein said dielectric ceramic contains Cu.

11. The multilayer ceramic component according to claim 2, wherein said dielectric ceramic contains Cu.

12. The multilayer ceramic component according to claim 1, wherein said dielectric ceramic contains Cu.

13. The multilayer ceramic component according to claim 1, which is a capacitor and contains a pair of external electrodes disposed on the external surface of said multilayer body, each of which is electrically connected to a different internal electrode.

14. The multilayer ceramic component according to claim 13, wherein said internal electrodes comprise Al.

15. The multilayer ceramic component according to claim 14, wherein said dielectric ceramic contains Cu.

16. The multilayer ceramic component according to claim 13, wherein said dielectric ceramic contains Cu.

17. A dielectric ceramic comprising
    one of a bismuth layered compound containing Sr, Bi and Ti, a bismuth layered compound containing Sr, Bi and Nb, and a bismuth layered compound containing Ca, Bi and Ti as a primary ingredient, and auxiliary ingredients of Bi and at least one member selected from the group consisting of Cu, Ba, Zn and Li,
    wherein if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

18. The dielectric ceramic according to claim 17, wherein said dielectric ceramic contains Cu.

19. A method for manufacturing a multilayer ceramic capacitor, comprising :
    providing a ceramic slurry comprising a primary ingredient powder comprising one of a bismuth layered compound containing Sr, Bi and Ti, a bismuth layered compound containing Sr, Bi and Nb, and a bismuth layered compound containing Ca, Bi and Ti, and an auxiliary ingredient comprising a Bi compound and at least one member of the group consisting of Cu compound, Ba compound, Zn compound and Li compound;
    obtaining ceramic green sheets from said ceramic slurry;
    laminating a plurality of said ceramic green sheets and a pair of internal electrode layers disposed on different interfaces between adjacent green sheets to for a non-sintered multilayer body; and
    sintering said non-sintered multilayer body to form a multilayer body with a pair of internal electrodes disposed between different dielectric layers,
    wherein the multilayer body satisfies the conditions that if the Ti content is 400 molar parts or the Nb content is 200 molar parts, then (Bi content-Ti content) or (Bi content-Nb content) is equal to or greater than 1 molar part and less than 7.5 molar parts and the total content of Cu, Ba, Zn and Li is equal to or greater than 1 molar part and less than 10 molar parts.

20. The method for manufacturing a multilayer ceramic capacitor according to claim 19, wherein said internal electrodes comprise Al.

* * * * *